J. N. FURMAN.
Apparatus for Raising Sunken Vessels.

No. 165,226. Patented July 6, 1875.

WITNESSES:
C. Neveux
A. F. Terry

INVENTOR:
J. N. Furman
BY
ATTORNEYS.

UNITED STATES PATENT OFFICE.

JOEL NELSON FURMAN, OF PATCHOGUE, NEW YORK.

IMPROVEMENT IN APPARATUS FOR RAISING SUNKEN VESSELS.

Specification forming part of Letters Patent No. 165,226, dated July 6, 1875; application filed April 17, 1875.

*To all whom it may concern:*

Be it known that I, JOEL N. FURMAN, of Patchogue, Suffolk county, New York, have invented a new and Improved Apparatus for Raising Sunken Vessels, of which the following is a specification:

My invention consists of a couple of tanks to be sunk along the sides of the sunken vessel by filling with water, the tanks being inclined on the bottom so as to "heel" over from the vessel, and having contrivances by which they are locked together at each end of the vessel, so that when they rise, by having the water discharged or air pumped in, they swing up against the sides of the vessel and gripe it firmly, so as to hold on without any other fastening.

Figure 1:
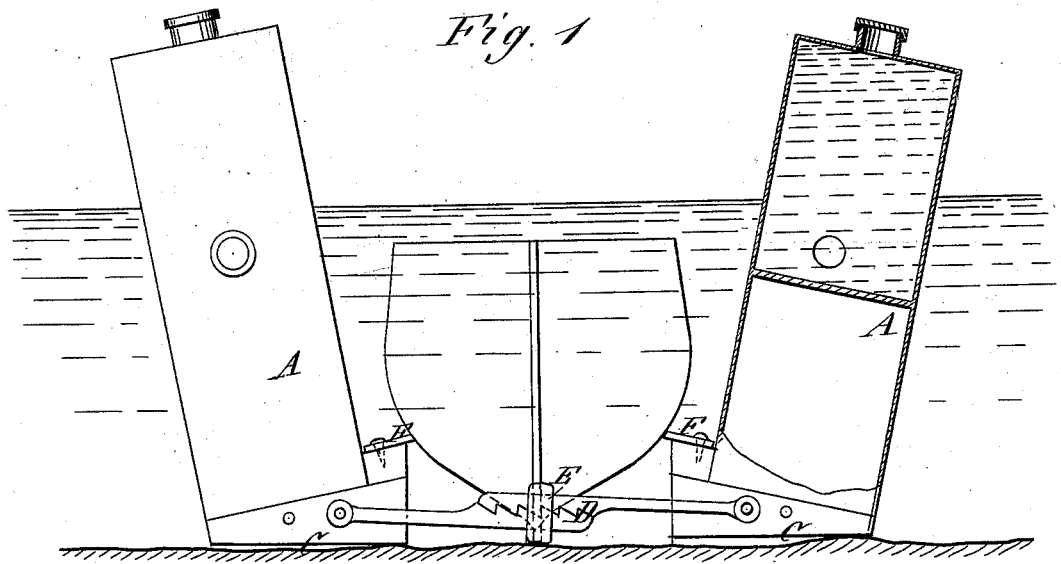
Figure 2:
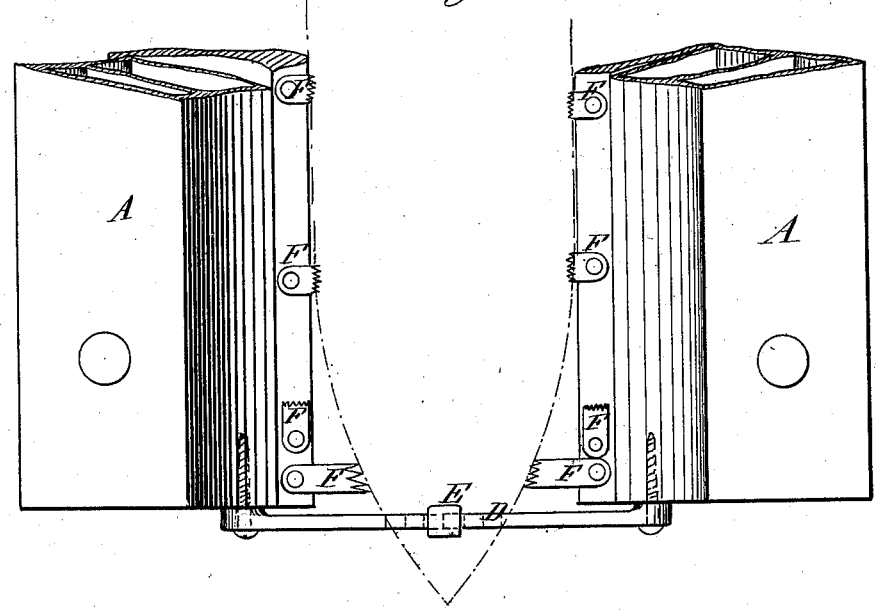

Figure 1 is an end elevation of my improved apparatus with a part sectioned, and Fig. 2 is a plan view.

Similar letters of reference indicate corresponding parts.

A represents the two tanks to be sunk along the sides of the vessel B, as shown, by water pumped into them. C represents the inclined bottom to cause them to heel over to be pressed against the sides of the vessel as they rise. D represents notched bars, and E a loop, by which the tanks are coupled and locked together, and F represents dogs to be applied for projecting against the sides of the vessel, as shown, when the tanks swing toward the vessel in their tendency to rise vertically. The tanks may be made to swing over toward the vessel more than to the vertical line by having them partitioned vertically and letting out the water from the outer partition only. The tanks will, by preference, be partitioned into upper and lower compartments, so that the water for sinking them may be contained in the upper compartment, so as to be discharged by flowing out when the tanks are not sunk too deep. They will be raised by forcing air in upon the water when deeply sunk to force the water out through the bottoms.

Having thus described my invention, I claim as new and desire to secure by Letters Patent—

The combination of a pair of tanks, A, and contrivances for locking them together, the tanks being constructed with inclined bottoms to heel over, and when rising gripe the sides of the vessel to be raised.

JOEL NELSON FURMAN.

Witnesses:
 WILLIAM ROE,
 CHARLES PRICE.